RE 25307

June 13, 1961  D. JOHNSTON  2,988,025
METHOD FOR APPLYING LIQUIDS INTO THE SOIL
Filed April 1, 1954  2 Sheets-Sheet 1

INVENTOR
Douglas Johnston

BY
Cushman, Darby & Cushman
ATTORNEYS

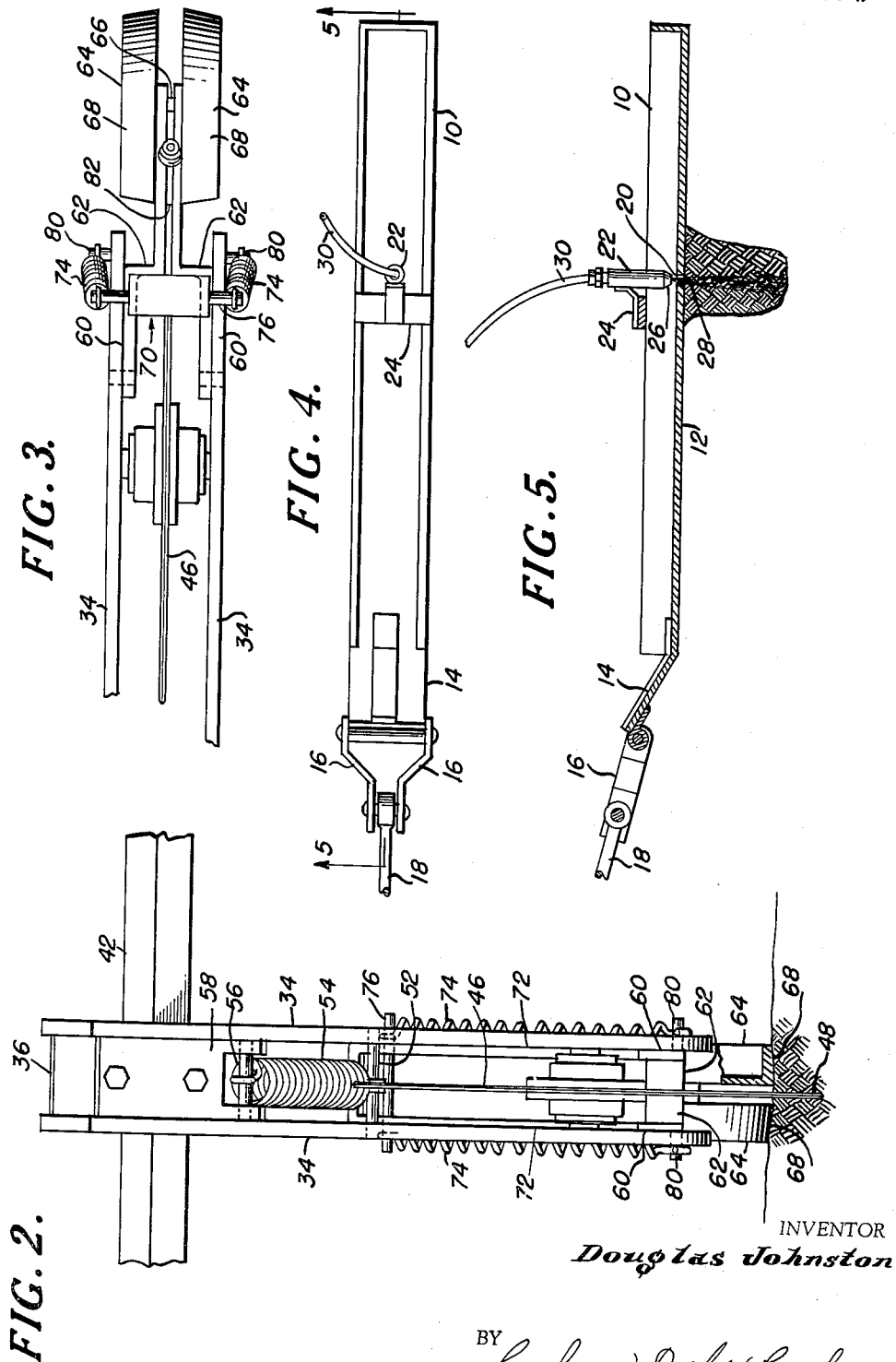

United States Patent Office 2,988,025
Patented June 13, 1961

2,988,025
METHOD FOR APPLYING LIQUIDS INTO THE SOIL
Douglas Johnston, Huntsville, Ala., assignor to John Blue Company, Incorporated, Huntsville, Ala., a corporation of Alabama
Filed Apr. 1, 1954, Ser. No. 420,425
4 Claims. (Cl. 111—6)

This invention relates to the art of applying liquids into the soil, and more particularly liquids for agricultural purposes, such as liquid fertilizers, fumigants, and other agricultural chemicals.

In the past it has been the practice to apply agricultural liquids by means of a ground-working tool which penetrates into and is pulled through the soil at an appreciable depth, frequently of the order of 6 or more inches. The liquid being applied is conducted through a passageway, formed either integral with the ground-working tool or by a separate conduit secured to the same, to the lower end of the ground-working tool for discharge adjacent the bottom of the furrow formed by such tool.

This method of applying agricultural or other types of liquids into the soil has certain disadvantages. First of all a considerable amount of power is required to pull a ground-working tool through the soil, particularly where a plurality of such tools are ganged together for simultaneous operation. Secondly, the carrier for such tools must be in the nature of heavy high-strength equipment in order to resist the resultant forces thereon. Thirdly, a ground-working tool of this nature has a relatively-short useful life, because it is rapidly worn away by the abrasive contact of the soil. Such wearing away, of course, necessitates relatively-frequent replacement of the tool. Fourthly, the swath width, when present-day liquid-applicator ground tools are used in a ganged relation, is limited by the effective drawbar pull of a towing machine, usually a tractor. Fifthly, when liquid is applied by present-day practices to heavily-packed soil, such as pastures and golf courses, the width of the swath of ganged tools is even more limited because of the heavy draft encountered. In such instances, the draft is so heavy that liquid-applying operations are relatively slow and expensive. Sixthly, liquid application by present-day practices also cuts plant roots where present, and the application is obstructed by heavy roots and rocks lying below the surface of the soil.

In some instances, the liquid being so applied is liquified gas, such as anhydrous ammonia, which quickly reverts to its gaseous state on escape from the tool. While the soil will absorb anhydrous ammonia, both in its liquid and in its gaseous state, there is a considerable problem in closing the furrow immediately behind the traveling ground-working applicator tool in order to effectively seal in a gaseous material and prevent its escape upwardly through the disturbed soil behind the traveling tool and subsequent dissipation in the atmosphere.

As previously stated, in present methods of applying anhydrous ammonia into the soil, the depth of penetration of the ground-working tool ordinarily is of the order of 6 inches or more. This depth of penetration of the anhydrous ammonia into the soil is not essential from the point of view of agronomy. The depth of penetration is essential, however, with present-day application practices, so that the gaseous ammonia can be satisfactorily sealed into the soil. At lesser depths of penetration by the aforedescribed ground-working tools, there is excessive loss of anhydrous ammonia by working its way upwardly through the disturbed soil in the furrow behind the traveling ground-working applicator tool and dissipating into the atmosphere.

Accordingly, it is an object of this invention to provide an improved novel method for applying liquids into the soil.

It is another object of this invention to provide a method for applying liquids into the soil which reduces to a minimum the power required to traverse the soil with the liquid-applying implement.

It is another object of this invention to provide a method for applying liquids into the soil which will permit a wider swath of application at each traverse of the applying equipment.

It is another object of this invention to provide a method for applying liquid into the soil which will eliminate the necessity of heavy high-strength applicator equipment, even when the application is being made to hard-packed soil.

It is another object of this invention to provide a method for applying liquid into the soil which reduces to a minimum the damaging of plant roots and which is unaffected by thick roots, rocks, etc., lying beneath the surface of the soil.

It is another object of this invention to provide a method for applying liquid into the soil which reduces to a minimum the wear on the liquid applying instrumentalities.

It is another object of this invention to provide a novel method for applying a normally-gaseous pressurized liquid into the soil which reduces to a minimum the loss occasioned by escape of the gas from the soil to the atmosphere.

It is a further object of this invention to provide a novel method of applying a pressurized normally-gaseous liquid into the soil which minimizes the escape of the gas from the soil into the atmosphere, even at reduced depths of penetration of the liquid into the soil.

Other objects and advantages of the invention will become apparent from the following description and accompanying drawings, in which:

FIGURE 2 is a front elevational view of the apparatus shown in FIGURE 1.

FIGURE 3 is a fragmentary plan view of the apparatus shown in FIGURE 1 and taken substantially on line 3—3 thereof.

FIGURE 4 is a plan view of another form of apparatus for practicing the invention.

FIGURE 5 is a vertical sectional view taken substantially on line 5—5 of FIGURE 4.

THE METHOD

Figure 1:
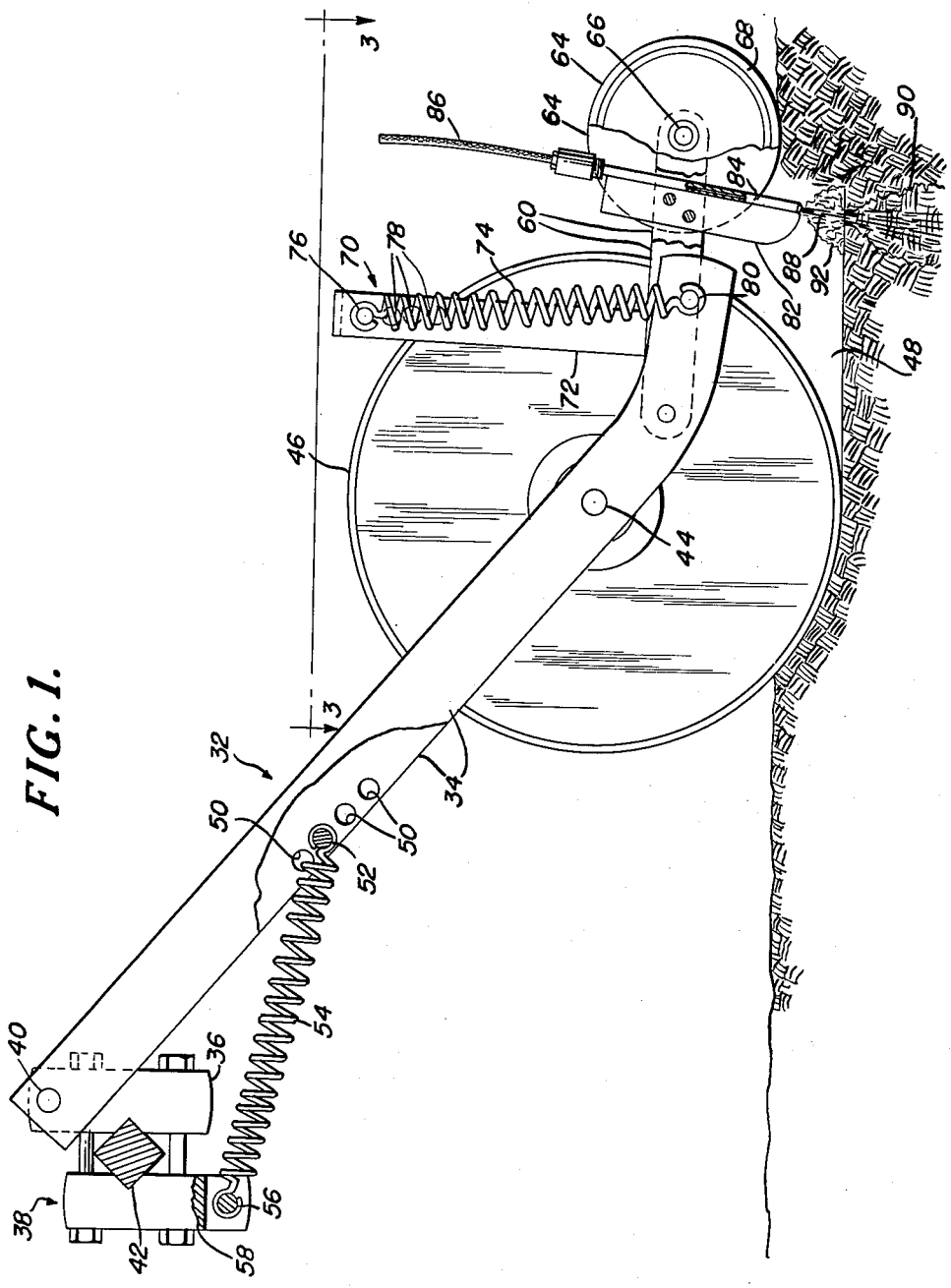
FIGURE 1 is a side elevational view of a preferred form of apparatus for practicing the invention.

The invention essentially contemplates the application of a liquid into the soil by directing against the surface thereof a traveling fine jet of the liquid which has sufficient velocity to penetrate the soil of its own accord without having a trench or furrow cut for its reception. Because the jet is quite fine, there is no appreciable displacement of the soil. In other words, the jet itself does not dig a trench or furrow. In actual practice, it has been found that velocities of the liquid jet of the order of 700 to 1,100 feet per second are sufficient to obtain penetration depths that are highly satisfactory from the point of view of agronomy, e.g., of the order of 4 inches or more. Of course, the depth of penetration for a given jet velocity depends considerably on the type of soil being treated, that is, whether the soil is hard-packed and dense or relatively soft and porous.

Practical apparatus for applying the principles of the invention comprises a nozzle designed to emit a fine jet of liquid and to which liquid is supplied under very high pressure. The apparatus also includes a suitable traveling carriage on which the nozzle is mounted in an upright position with its tip or discharge orifice, i.e., the jet source, positioned as close as possible to the surface of the ground. The liquid is supplied to the nozzle from an appropriate source, such as a high-pressure pump. There are two reasons for positioning the nozzle tip close to the surface of the soil. One, a high-velocity liquid jet tends to break up somewhat in the air and thus lose its velocity and penetrating power. Secondly, in the event that the liquid being jetted is normally a gas, e.g., anhydrous ammonia, some undesirable vaporization occurs immediately as the jet leaves the nozzle orifice.

In actual practice of the invention, when the nozzle tip is held closely adjacent the surface of the soil, it has been found that on penetrations of the jet of the order of about 4 inches depth, there is very little loss of anhydrous ammonia occasioned by vaporization thereof and escape upwardly through the surface of the soil. Soil will readily absorb both liquid and gaseous anhydrous ammonia, but in applying anhydrous ammonia by present-day practices the soil is so disturbed in the furrow behind a traveling ground-working tool that a considerable portion of the applied anhydrous ammonia works upwardly through the soil in its gaseous form and is dissipated in the atmosphere. On the other hand, when anhydrous ammonia is supplied in accordance with this invention, the soil is relatively undisturbed, so that there is very little loss of the anhydrous ammonia in the form of gas working upwardly through the soil.

The velocity of the liquid jet at the discharge orifice of the nozzle is determined by the formula $V=\sqrt{2gh}$, where $g$ is the acceleration due to gravity, normally 32 feet per second, and $h$ is the liquid head in feet. $h$ also equals $$\frac{p}{.433s}$$

where $p$ is pressure in pounds per square inch and $s$ is specific gravity of the liquid under consideration. Therefore, $$V=\sqrt{\frac{147.8p}{s}}$$

This formula, of course, is based on a nozzle which is 100% efficient in converting pressure energy into velocity energy. In practice, nozzles are not 100% efficient and friction losses occur. For practical purposes, however, the aforedescribed formula is adequate.

Thus, using the aforementioned formula, the pressure required to jet anhydrous ammonia, which has a specific gravity of .623, at a velocity of about 700 feet per second is about 2,000 pounds per square inch. For a velocity of about 850 feet per second, a pressure of about 3,000 pounds per square inch is required, and for a velocity of about 1,100 feet per second, a pressure of about 5,000 pounds per square inch is required. If the specific gravity of the liquid is greater, higher pressures are required to achieve the aforementioned jet velocities. Thus, if the specific gravity is 1, a pressure of about 3,300 pounds per square inch is required to obtain a jet velocity of about 700 feet per second.

In actual tests, it has been found that nozzles having a jet orifice of the order of from about .007 inch in diameter to about .050 inch in diameter are satisfactory for emitting high velocity jets of liquid that are fine enough to achieve the desired soil penetration without appreciable displacement or disruption of the soil being treated. Depending on actual working pressure, the rate of flow of the liquid from a nozzle of the aforementioned size may vary from about .050 to about .750 gallon per minute.

In treating soil by the aforedescribed method and apparatus, the amount of liquid applied per unit of area is determined, of course, by the speed of travel of the nozzle over the surface of the ground. If this speed is taken as a constant, however, the amount of liquid applied then can be varied to some extent by varying the pressure of the liquid. Pressure variance, of course, varies the depth of penetration, but if an optimum depth of penetration is being achieved by a relatively-low pressure, there is no disadvantage from the standpoint of agronomy in a greater depth of penetration for the purpose of applying a greater amount of liquid. The amount of application can also be varied to an even greater extent by varying the size of the nozzle, i.e., the size of the high velocity liquid jet. In other words, for a given liquid pressure a change in size will not affect the velocity of the jet, provided the pressure remains the same as before. Hence, a change in nozzle size will not affect the depth of penetration, but, instead, will increase or decrease the amount of application of the liquid per unit area of the surface of the soil.

As a typical example, for a given-size nozzle a pressure on the liquid of, say 4,000 pounds per square inch will apply a normal quantity of liquid per unit area at a given rate of speed of nozzle travel. Therefore, by maintaining this speed of travel constant, a somewhat lesser amount of application can be obtained by decreasing the pressure, say, down to 3,000 pounds per square inch, or a somewhat greater amount of application can be obtained by increasing the pressure up to, for example, 5,000 pounds per square inch. In the event that an even greater amount of application is required for a particular situation, the size of a nozzle would be increased and the pressure on the liquid could then be decreased to, say, 4,000 pounds per square inch to obtain a greater application but substantially the same depth of penetration as with the smaller-size nozzle at the same liquid pressure. Instead of changing nozzle size, additional nozzles can be used for travel either behind or slightly to one side of the single nozzle mentioned above. In actual usage, apparatus for practicing this invention will include a row of laterally-spaced nozzles that are advanced over the surface of the soil in a direction perpendicular to the length of the row to cover a wide swath. Of course, increasing the number of nozzles in a row of given length will increase the amount of application per unit area with all of the other factors being a constant.

*Apparatus*

Referring now to the drawings, there is shown in FIGURES 4 and 5 a relatively simple form of apparatus for practicing the method of this invention. The apparatus includes a slide or sled 10 having a flat undersurface 12 and an upwardly-inclined front end 14. A pair of links 16 are pivotally connected to the front end 14 of the slide 10 for pivotal attachment to a draw-bar 18 of a suitable towing vehicle, such as a tractor (not shown). An aperture 20 (FIGURE 5) is provided in the slide 10, along its length, and a jet nozzle 22 is supported by a bracket 24 in upright position above the aperture and with its tip 26 closely thereadjacent for discharging a high-velocity jet 28 of liquid through the aperture and into the soil beneath the slide. The liquid being applied is supplied to the nozzle 22 through an appropriate conduit 30 that leads to a high-pressure source of the liquid, such as a high-pressure pump (not shown) having its inlet connected to a tank (not shown) containing a supply of the liquid. Both the tank and the pump may be carried on the towing vehicle, and in the event that the latter is a tractor, the pump may be driven by a power take-off thereon. Preferably, appropriate means (not shown) are provided for varying the pressure developed by the pump. In operation of the apparatus, one or more slides 10 of the aforedescribed type are towed in laterally-spaced relation over the surface of the ground at a relatively-constant speed, while the nozzles 22 direct high-velocity liquid jets 28 against the surface of the soil for penetration thereof to an appreciable depth in accordance with the aforedescribed method.

Referring now to FIGURES 1 to 3 of the drawings, there is shown a preferred type of apparatus for practicing the invention. The apparatus comprises a carriage 32 which includes a pair of downwardly and rearwardly-included arms 34 that are pivotally connected at their upper ends to one part 36 of a tool bar clamp 38 by a pivot pin 40. The clamp 38 is adapted to be secured to a tool bar 42 that is usually mounted on a tractor (not shown), or on a trailer type of vehicle (not shown). The tool bar 42 normally is hydraulically controlled for raising and lowering movements on the vehicle. Journaled on an axle 44 extending transversely between the arms 34 adjacent their lower ends is a coulter 46 adapted to form a relatively-shallow slot 48 in the ground. A plurality of aligned apertures 50 in the carriage arms 34, substantially midway of the length of the same, selectively receive a transverse pin 52. A coil tension spring 54 is secured to the pin 52 and to a transverse pin 56 on the other part 58 of the tool bar clamp 38 for urging the coulter 46 against the ground. By selectively inserting the pin 52 in the apertures 50, the force with which the coulter 46 is urged against the ground may be adjusted. The depth of the slot 48 cut by the coulter 46 depends to a great extent upon the hardness of the ground, but can be adjusted by adjusting the tension of the spring 54, as described above.

Pivotally connected to the lower ends of the carriage arms 34, below the coulter axle 44, are a pair of trailing arms 60, which rearwardly of their pivotal connection to the arms 34 bend inwardly toward each other, as at 62 (FIGURE 3), and then extend rearwardly in closely-spaced adjacency. At pair of ground-engaging wheels 64 are disposed on opposite sides of the trailing ends of the arms 60 and are journaled on an axle 66 extending transversely through the latter. The wheels 64 are of substantially smaller diameter than the coulter 46 and preferably have substantially frusto-conical treads 68, with the apexes of the treads facing outwardly, as is best shown in FIGURE 2. An inverted, generally U-shaped upright bracket 70 has the ends of its legs 72 secured to the arms 60 forwardly of the bend 62 therein. A pair of coil tension springs 74 are connected to the projecting ends of a pin 76 extending transversely through one of several pairs of aligned apertures 78 in the bracket 70. The other ends of the springs 74 are connected to lateral pins 80 on the lower and rear ends of the carriage arms 34, to thus exert a force which constantly urges the wheels 64 into engagement with the soil. This force can be adjusted by selectively inserting the pin 76 in the apertures 78.

Mounted between the arms 60, and actually between the front portions of the wheels 64, is a generally-upright thin steel runner 82, preferably of no greater width than the slot 48 and having a downwardly and rearwardly-curved front edge and a substantially straight trailing edge. Secured to the rear end of the runner 82 is a jet nozzle 84 of no greater diameter than the thickness of the runner 82 and having its tip spaced slightly above the lower end of the trailing edge of the runner. A high-pressure conduit 86 is connected to the nozzle 84 for supplying the same with liquid under high pressure.

In operation, the apparatus is towed along by a vehicle and the coulter 46 cuts a narrow slot 48 in the soil, as is shown best in FIGURE 1. The jet nozzle 84 projects somewhat into the slot 48 and discharges a high-velocity fine jet 88 of liquid against the bottom of the slot for penetration into the soil, as is indicated at 90. Although there may be some rebound, splatter, or feather spray 92 occasioned by the impact of the jet 88 against the bottom of the slot 48, this spray is within the slot. Since there is a large area of the soil, i.e., both sides of the slot 48, exposed to the spray 92, the major portion of the latter will be absorbed in the side walls of the slot. The same absorption effect occurs when the liquid being jetted is normally a gas, e.g., anhydrous ammonia. Even though some vaporization takes place before impact of the jet 88 against the bottom of the slot 48, the major portion of the vaporized gas will also be absorbed by the side walls of the slot. Behind the nozzle 84, the slot 48 is substantially closed by the compression action of the wheels 64, so that a gas-sealing-in effect is had in the event the liquid being applied is normally gaseous.

Although the tip of the jet nozzle 84 does not run closely against the bottom of the slot 48, the apparatus shown in FIGURES 1 to 3 is preferred to that shown in FIGURES 4 and 5, because of the difficulty in making the slide 10 of the latter apparatus hug the ground closely, especially where the ground is uneven or rocky. Moreover, the slide apparatus tends to rise up on encountering a stone or a clod, and thus raise the tip 26 of the nozzle 22 an undesirable height from the surface of the ground. In contrast to this type of operation, in the coulter-wheel type of apparatus, even though the coulter 46 encounters extremely hard or compact soils, or a rock or the like, and rises out of the ground, the springs 74 will serve to keep the wheels 64 in engagement with the ground so that the tip of the nozzle 84 rises only slightly and is still maintained in close adjaceny to the surface of the ground.

Ordinarily, the coulter 46 is set to cut a slot 48 of no appreciable depth and simply acts as a gauge wheel in keeping the nozzle 84 in close adjacency to the surface of the soil. For extremely hard and compact soils, however, the coulter 46 will be set to cut a slot 48 of the order of one or two inches deep, in order to increase the effective penetration of the jet 88 without undue increases in pressure and also to reduce possible losses of liquid or gas by rebound from a very hard surface. As described above, however, since the tip of the nozzle 84 normally runs within the slot 48 and beneath the actual soil surface, any gas or feather spray 92 caused by vaporization or rebound, or "back blast," from the bottom of the slot 48 is absorbed for the most part by the large surface area provided by the side walls of the slot. Even for this slot depth, however, the nozzle 84 does not extend to the slot bottom, because, if the nozzle tip were positioned deeper than the position shown in FIGURE 1 and if the coulter would rise appreciably on encountering extremely hard ground or a stone or the like, the nozzle tip might drag against the ground and cause rapid wear or possible deformation thereof, even though somewhat protected by the runner 82.

It thus will be seen that the objects of this invention have been fully and effectively accomplished. It will be realized, however, that the specific method and embodiments shown and described for the purpose of illustrating the principles of the invention are subject to change without departure from such principles. Therefore, this invention includes all modifications encompassed within the spirit and scope of the following claims.

I claim:

1. The method of applying a highly volatile liquid into the soil for agricultural purposes comprising: directing a jet of the liquid against unappreciably disturbed soil with the source of said jet disposed closely against the soil surface, with the fineness of said jet being of the order of from about .007 to about .050 inch in diameter at its source, and with the velocity of said jet being at least of the order of 700 feet per second at its source; and moving the jet along the soil surface, whereby the liquid will penetrate a considerable distance into the soil without appreciable disturbance of the latter so that the gas formed by vaporization of the liquid within the soil will, for the most part, be retained therein without loss to the atmosphere.

2. The method of applying anhydrous ammonia into the soil for fertilizing purposes comprising: directing a jet of anhydrous ammonia against unappreciably disturbed soil with the source of said jet disposed closely against the soil surface, with the fineness of said jet being of the order of from about .007 to about .050 inch in diameter at its source, and with the velocity of said jet being at least of the order of 700 feet per second at its source; and moving said jet along the soil surface, whereby the anhydrous ammonia will penetrate the soil to a depth sufficient for fertilizing purposes without appreciable disturbance of the soil so that gaseous ammonia formed by vaporization of the anhydrous ammonia within the soil will, for the most part, be retained therein without loss to the atmosphere.

3. The method of applying anhydrous ammonia into the soil for fertilizing purposes, the steps comprising: pressurizing anhydrous ammonia to a pressure at least of the order of 2,000 pounds per square inch; converting the pressure energy of the anhydrous ammonia to velocity energy in the form of a jet of anhydrous ammonia having a velocity at least of the order of 700 feet per second at its source and a fineness of the order of from about .007 to about .050 inch in diameter at its source; directing said jet against the surface of unappreciably disturbed soil with said jet source disposed closely adjacent said surface; and moving said jet along the soil surface, whereby the anhydrous ammonia will penetrate the soil to a depth sufficient for fertilizing purposes without appreciable disturbance of the soil so that gaseous ammonia formed by vaporization of the anhydrous ammonia within the soil will, for the most part, be retained therein without loss to the atmosphere.

4. The method of applying a highly volatile liquid into hard surfaced soil for fertilizing purposes, the steps comprising: cutting a narrow, relatively-shallow slot, not exceeding a depth of the order of about 2 inches through the hard surface layer of the soil; directing a jet of the liquid against unappreciably disturbed soil at the bottom of the slot with the source of said jet disposed within the slot, with the fineness of said jet being of the order of from about .007 to about .050 inch in diameter at said source, and with the velocity of said jet being at least of the order of 700 feet per second at said source; and advancing said jet along the slot, whereby the liquid will penetrate a considerable distance into the soil at the bottom of the slot without appreciable disturbance of the latter so that the gas formed by vaporization of the liquid within the soil will, for the most part, be retained therein without loss to the atmosphere.

References Cited in the file of this patent

UNITED STATES PATENTS

| Number | Name | Date |
|---|---|---|
| 734,615 | Roberts | July 28, 1903 |
| 962,728 | Ward | June 28, 1910 |
| 2,341,859 | Edwards | Feb. 15, 1944 |
| 2,380,534 | Lockhart | July 31, 1945 |
| 2,413,561 | Hehr | Dec. 31, 1946 |
| 2,439,743 | McEwen | Apr. 13, 1948 |
| 2,515,317 | Schindler | July 18, 1950 |
| 2,580,145 | White | Dec. 25, 1951 |
| 2,719,498 | Goolsby | Oct. 4, 1955 |
| 2,722,902 | Hyatt | Nov. 8, 1955 |

FOREIGN PATENTS

| Number | Country | Date |
|---|---|---|
| 23,036/29 | Australia | Mar. 28, 1930 |
| 150,744 | Australia | July 5, 1951 |

OTHER REFERENCES

Publication: "Agricultural Engineering," pages 394–396 required. September 1947.